(12) United States Patent
Crews et al.

(10) Patent No.: US 10,108,559 B2
(45) Date of Patent: Oct. 23, 2018

(54) APPARATUS FOR TRANSMITTING DATA THROUGH THE UNIVERSAL SERIAL BUS, CONVERTING TO SCSI PROTOCOLS FOR COMPUTER PERIPHERALS

(71) Applicant: Xitron LLC, Ann Arbor, MI (US)

(72) Inventors: Karen Jo Crews, Ypsilanti, MI (US); Bret Anthony Farrah, Tecumesh, MI (US); Mark Scarbrough, Ann Arbor, MI (US); Eric Patrick Nelsen, Chelsea, MI (US)

(73) Assignee: Xitron LLC, Ann Arbor, MI (US)

( * ) Notice: Subject to any disclaimer, the term of this patent is extended or adjusted under 35 U.S.C. 154(b) by 0 days.

(21) Appl. No.: 15/184,839

(22) Filed: Jun. 16, 2016

(65) Prior Publication Data

US 2016/0371201 A1 Dec. 22, 2016

Related U.S. Application Data

(60) Provisional application No. 62/180,886, filed on Jun. 17, 2015.

(51) Int. Cl.
| | |
|---|---|
| *G06F 3/00* | (2006.01) |
| *G06F 13/10* | (2006.01) |
| *G06F 13/42* | (2006.01) |
| *G06F 13/40* | (2006.01) |
| *G06F 13/38* | (2006.01) |
| *G06F 3/06* | (2006.01) |

(52) U.S. Cl.
CPC ........ *G06F 13/102* (2013.01); *G06F 13/4068* (2013.01); *G06F 13/4282* (2013.01); *G06F 3/0661* (2013.01); *G06F 13/385* (2013.01); *G06F 2213/0036* (2013.01); *G06F 2213/0042* (2013.01)

(58) Field of Classification Search
CPC ............................ G06F 13/385; G06F 3/0661
See application file for complete search history.

(56) References Cited

U.S. PATENT DOCUMENTS

| | | | | |
|---|---|---|---|---|
| 6,069,707 | A * | 5/2000 | Pekelman | H04N 1/00278 358/1.13 |
| 6,973,516 | B1 * | 12/2005 | Athanas | G06F 13/387 710/100 |
| 2001/0003197 | A1 * | 6/2001 | Matsushima | G06F 3/0607 710/64 |

(Continued)

*Primary Examiner* — Zachary K Huson
(74) *Attorney, Agent, or Firm* — Stinson Leonard Street LLP

(57) ABSTRACT

An apparatus for controlling a small computer system interface (SCSI) peripheral via a universal serial bus (USB) port of a computing device is provided. The apparatus includes a programmable circuit board (PCB) having firmware encoded thereon. The firmware is configured to convert USB signals to SCSI signals and to further convert SCSI signals to USB signals. The apparatus also includes a power supply configured to provide power to the PCB. The apparatus further includes a SCSI interface coupled to the PCB and configured to receive a SCSI cable to provide connectivity to the SCSI peripheral. The apparatus additionally includes a USB interface coupled to the PCB and configured to receive a USB cable to provide connectivity to the computing device via the USB port of the computing device.

19 Claims, 3 Drawing Sheets

(56) References Cited

U.S. PATENT DOCUMENTS

| | | | | |
|---|---|---|---|---|
| 2009/0158124 A1* | 6/2009 | Kawai | ............... | G06F 3/0614 |
| | | | | 714/763 |
| 2010/0185808 A1* | 7/2010 | Yu | ............... | G06F 13/1684 |
| | | | | 711/103 |
| 2012/0102251 A1* | 4/2012 | Ranjan | ............... | G06F 13/387 |
| | | | | 710/300 |
| 2016/0307195 A1* | 10/2016 | Cantwell | ............... | G06Q 20/401 |

* cited by examiner

APPARATUS FOR TRANSMITTING DATA THROUGH THE UNIVERSAL SERIAL BUS, CONVERTING TO SCSI PROTOCOLS FOR COMPUTER PERIPHERALS

PRIORITY CLAIM AND CROSS-REFERENCE TO RELATED APPLICATIONS

The present application claims priority to U.S. Provisional Patent Application Ser. No. 62/180,886, filed Jun. 17, 2015, which is hereby incorporated by reference in its entirety for all purposes.

TECHNICAL FIELD

The present invention relates generally to an apparatus, systems, and methods for utilizing a universal serial bus to enable small computer system interface communication between a computer and peripherals that utilize small computer system interface.

BACKGROUND

Many computer peripherals are designed to communicate and operate through use of a small computer system interface (SCSI). Typically, use of SCSI is accomplished by the use of a peripheral component interconnect (PCI) card inserted into a slot in a computer.

However, many recent models of computers have been manufactured without PCI slots. Further, PCI card manufacturers have decreased their production of PCI cards. Additionally, many modern operating systems fail to recognize SCSI cards because the associated drivers were not updated by the card manufacturers.

As a result, many expensive peripheral devices that are designed to use SCSI protocols may lack a mechanism for interaction with many existing computer systems. As such, these peripherals may be rendered obsolete or unusable. Such peripherals can include expensive equipment such as printers and scanners. Alternatively, the associated host computers may have to utilize obsolete operating systems to support such peripherals, thus providing inadequate support to users of the host computer.

SUMMARY OF THE DISCLOSURE

It is the object of this disclosure to allow for communication and operation of SCSI peripherals using USB and USB protocols.

In one aspect, an apparatus for controlling a small computer system interface (SCSI) peripheral via a universal serial bus (USB) port of a computing device is provided. The apparatus includes a programmable circuit board (PCB) having firmware encoded thereon. The firmware is configured to convert USB signals to SCSI signals and to further convert SCSI signals to USB signals. The apparatus also includes a power supply configured to provide power to the PCB. The apparatus further includes a SCSI interface coupled to the PCB and configured to receive a SCSI cable to provide connectivity to the SCSI peripheral. The apparatus additionally includes a USB interface coupled to the PCB and configured to receive a USB cable to provide connectivity to the computing device via the USB port of the computing device.

In another aspect, a system configured to provide access for a computing device without small computer system interface (SCSI) connectivity to a SCSI peripheral is provided. The system includes a computing device having a processor and a memory. The computing device also has a first universal serial bus (USB) port. The system includes a SCSI peripheral having a first SCSI port. The system further includes a USB-SCSI interface. The USB-SCSI interface includes a programmable circuit board (PCB) having firmware encoded thereon. The firmware is configured to convert USB signals to SCSI signals and to further convert SCSI signals to USB signals. The USB-SCSI interface also includes a power supply configured to provide power to the PCB. The USB-SCSI interface further includes a SCSI interface coupled to the PCB and configured to receive a SCSI cable to provide connectivity to the SCSI peripheral at the first SCSI port. The USB-SCSI interface additionally includes a USB interface coupled to the PCB and configured to receive a USB cable to provide connectivity to the computing device via the first USB port of the computing device.

In yet another aspect, a method for providing access from a computing device without small computer system interface (SCSI) connectivity to a SCSI peripheral is provided. The method includes providing a programmable circuit board (PCB), encoding programming code onto the PCB, wherein the programming code includes firmware configured to convert USB signals to SCSI signals and to further convert SCSI signals to USB signals, providing a USB interface port in communication with the PCB, providing a SCSI interface port in communication with the PCB, and providing a power supply coupled to the PCB. The PCB is configured to be communicatively coupled to a USB port of a computing device via the USB interface port. The PCB is configured to be communicatively coupled to a SCSI port of a SCSI peripheral via the SCSI interface port.

DETAILED DESCRIPTION

Figure 1:
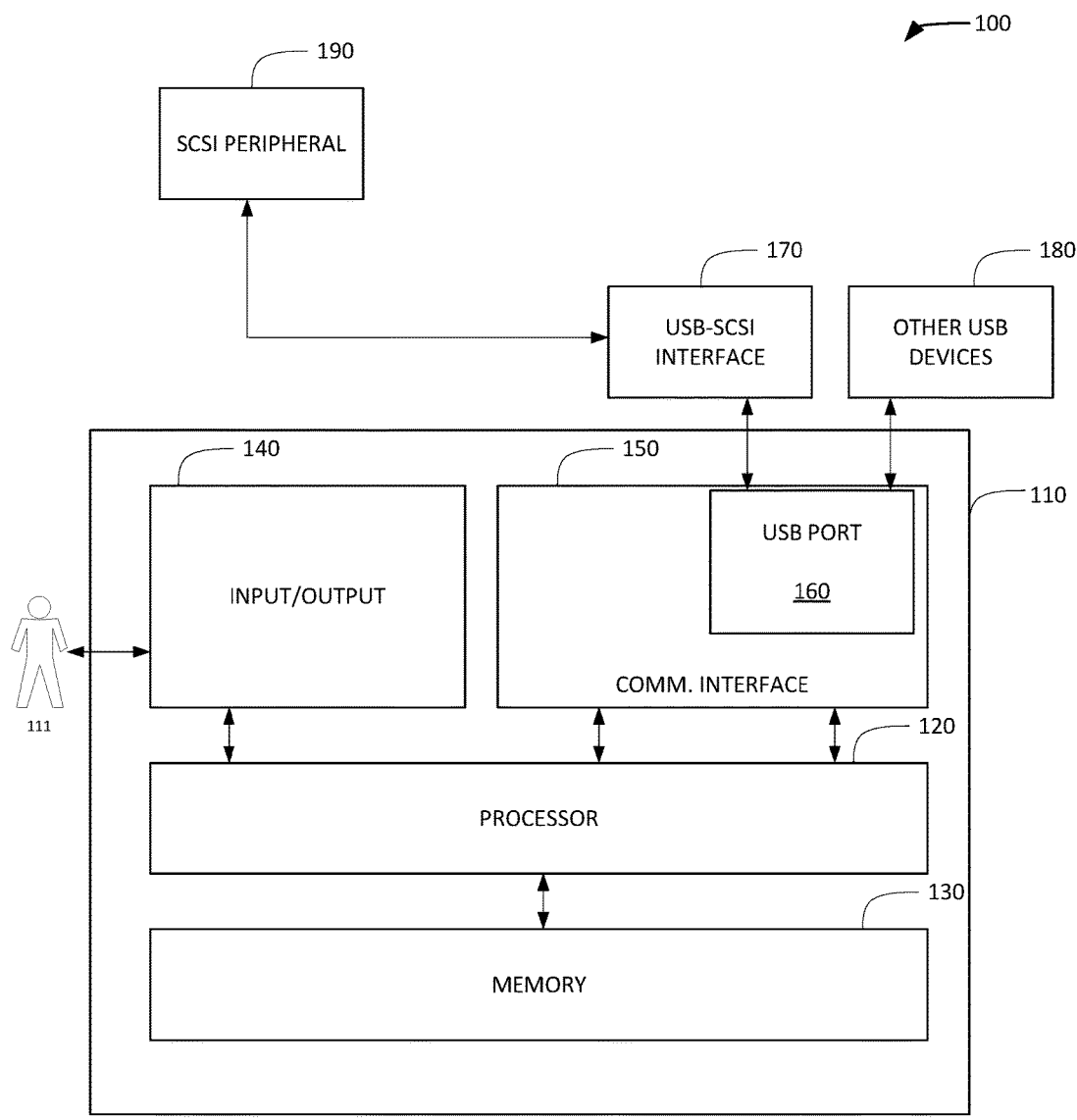
FIG. 1 illustrates an exemplary configuration of a computing device including a USB port that may use the USB-SCSI interface described herein to connect to a SCSI peripheral.

Systems and methods for allowing interaction between computers and peripherals that use SCSI protocols are desirable. Specifically, systems and methods are desired that allow interaction between computers and SCSI peripherals by the use of a universal serial bus (USB) and USB protocols.

Described herein are an apparatus, systems, and methods for providing and using a USB-SCSI interface to allow communication between a computing device and a SCSI peripheral. The USB-SCSI interface allows communication between a USB port of the computing device and a SCSI port of the SCSI peripheral. The USB-SCSI interface described includes an interface USB port and an interface SCSI port. The interface USB port is configured to receive a USB cable which further connects to a USB port of the computing device. The interface SCSI port is configured to receive a SCSI cable which further may connect to a SCSI port of the SCSI peripheral. As SCSI and USB ports may vary on computing devices and peripherals, the SCSI and USB cables accordingly may vary.

The USB-SCSI interface also includes a programmable circuit board (PCB). The PCB is encoded with firmware and software, described herein, that is configured to provide communication between the computing device and the SCSI peripheral. Accordingly, the PCB is in communication with the interface SCSI port and also in communication with the interface USB port. In some embodiments, the PCB is directly coupled to the interface SCSI port and the interface USB port. In other embodiments, the PCB is in wired communication with the interface SCSI port and the interface USB port.

As the computing device transmits data from its USB port to the interface USB port, the circuit board converts that data to the proper SCSI protocol necessary to communicate or "drive" the SCSI peripheral. Similarly, responsive communication from the SCSI peripheral is likewise transmitted back to the computing device.

In at least one embodiment, the USB-SCSI interface is housed in a standalone enclosure and utilizes a separate switchable power supply. In another embodiment, the USB-SCSI interface may be provided within or coupled to the computing device. In some such embodiments, the USB-SCSI interface may receive power via the computing device power supply. In a further embodiment, the USB-SCSI interface may be provided within or coupled to the SCSI peripheral. In some such embodiments, the USB-SCSI interface may receive power via the SCSI peripheral power supply. In any embodiment, the USB-SCSI interface receives power from a suitable source and applies power to the PCB to facilitate communication between the computing device and the SCSI peripheral.

Further, the systems and methods described herein include software drivers installed on the computing device. When the USB-SCSI interface is connected to the computing device USB port, the operating system recognizes a new component and loads the software drivers. Once the software drivers are installed on the computing device, the computing device may open up a communication channel with the USB-SCSI interface. An identification query may be sent through the USB-SCSI interface to the SCSI peripheral. In response, the SCSI peripheral sends signals back identifying itself.

In some embodiments, the firmware on the USB-SCSI interface probes the SCSI bus to look for SCSI peripherals prior to or upon connection with the computing device. The probe may consist of sending a SCSI command that is identified as "INQUIRY" to every SCSI identifier. If a device responds, the USB-SCSI interface becomes aware of an accessible SCSI peripheral. On such response, the USB-SCSI interface sends further INQUIRY commands to check for the capabilities of each responsive SCSI peripheral. One resend can check to see if the SCSI peripheral can communicate widely and a further resend can check to see if the SCSI peripheral can communicate in synchronous or asynchronous mode as well as data transfer rates associated with communication. Subsequently, the application plugin, USB-SCSI interface, and related software and firmware may use the INQUIRY command while factoring in previously determined attributes of each SCSI peripheral.

The USB-SCSI interface translates such signals to a format that can be communicated over the USB and thus received by the computing device operating system via the USB port. Once communication and identification are established, software applications designed to work with the SCSI peripheral can be launched and the SCSI peripheral may perform according to the original programming and intent.

As described, the USB-SCSI interface utilizes a combination of firmware and software. Firmware may be preprogrammed on a programmable chipset located on the PCB, loaded onto the PCB, and/or updated on the PCB. Further, the driver software may be pre-installed on the computing device, loaded on demand onto the computing device, and/or updated onto the computing device.

In some embodiments, a plurality of indicators may be included within USB-SCSI interface. Such indicators may be used to indicate that power is available to the USB-SCSI interface or that data is being transmitted between the USB-SCSI interface, the computing device, and the SCSI peripheral. In some such embodiments, the indicators used may include a light emitting diode (LED), a liquid crystal display (LCD), or any suitable indicator.

As described herein, the SCSI and USB cables utilized may include any suitable SCSI and USB cables for communication with computing devices and peripherals.

In operation, the USB-SCSI interface may be configured by coupling a USB cable between a USB port on the computing device and the interface USB port, and further coupling a SCSI cable between the interface SCSI port and a SCSI port on the SCSI peripheral, and providing power to the USB-SCSI interface via a power supply. Further, the computing device is configured by installing driver software and application links onto the computing device and launching software application links associated with the SCSI peripheral.

The apparatus, systems, and methods described herein utilize the USB port of computing devices as it is a frequently available form of hardware connectivity in modern computing devices. By engineering an apparatus that can plug into a computing device's USB slot and convert such signals and protocols to communications suitable for SCSI, SCSI peripherals may remain in use, saving in replacement and upgrade costs. Notably, the apparatus, systems, and methods described herein allow for the command and operation of a SCSI peripheral by a computing device with a USB port through the use of a USB-SCSI interface in a manner that is not otherwise available.

In order to create and utilize the USB-SCSI interface, the following steps must be undertaken: (a) provide a programmable circuit board (PCB); (b) encode the programming code onto the PCB; (c) write software drivers and application software links; (d) install software drivers and application software links onto a computing device; (e) provide a USB interface port in communication with the PCB; (f) provide a SCSI interface port in communication with the PCB; (g) provide a power supply to the PCB; (h) provide an interface housing; (i) house the PCB, USB interface port, SCSI interface port, and power supply within the interface housing; (j) provide a USB cable; (k) provide a SCSI cable; (l) connect the USB interface port to the computing device using the USB cable; (m) connect the SCSI interface port to a SCSI peripheral using the SCSI cable; (n) transmit an identification query from the computing device through the interface to the SCSI peripheral via the USB cable, the USB interface port, the PCB, the SCSI interface port, and the SCSI cable; (o) transmit a responsive signal from the SCSI peripheral to the computing device via the SCSI cable, the SCSI interface port, the PCB, the USB interface port, and the USB cable; and (p) establish communication between the computing device and the SCSI peripheral.

A technical effect of the systems, methods, and apparatus described herein is to enable efficient communication between computing devices that lack a SCSI interface and SCSI peripherals by providing a USB-SCSI interface that provides a method of communication between the computing device and SCSI peripherals. The described invention accordingly improves the technical field of peripheral networking by providing communication mechanisms that do not otherwise exist.

A technical effect of the systems and methods described herein is achieved by performing at least one of the following steps: (a) receiving a first signal from an application layer at a computing device; (b) using an output plugin to convert the command to a second signal suitable for receipt by a USB-SCSI interface via USB protocols; (c) transmitting the second signal to the USB-SCSI interface via a USB cable; (d) converting the second signal to a third signal suitable for receipt by a SCSI peripheral via a SCSI cable; and (e) transmitting the third signal to the SCSI peripheral via the SCSI cable.

As used herein, the term processor refers to central processing units, microprocessors, microcontrollers, reduced instruction set circuits (RISC), application specific integrated circuits (ASIC), logic circuits, and any other circuit or processor capable of executing the functions described herein.

As used herein, the term programmable circuit board (PCB) refers to a device that mechanically supports and electrically connects electronic components using conductive tracks, pads and other features etched from copper sheets laminated onto a non-conductive substrate. As suggested, PCBs may be programmed to include firmware. The PCBs described herein are configured to provide communications, translation, and connectivity between SCSI peripherals and computing devices via USB ports of such computing devices.

As used herein, the term universal serial bus (USB) refers to a standardized protocol that defines the cables, connectors and communications protocols used in a bus for connection, communication, and power supply between computers and electronic devices. Related terms, including but not limited to USB cables and USB ports, refer to devices that adopt the USB protocol. For example, a USB cable is a communications cable that adopts the USB standard and a USB port is a communications port in a computing device, interface device, or peripheral device that adopts the USB standard.

As used herein, the term small computer system interface (SCSI) refers to a set of standards for physically connecting and transferring data between computers and peripheral devices. Further, as described herein a SCSI peripheral refers to a peripheral device that is accessible via physical and data communication adhering to SCSI protocols. SCSI peripherals may include, but are not limited to computer to plate (CTP) devices used in imaging and printing processes, scanners, hard disk storage, tape storage, printers, CD/DVD-ROM devices, processor devices, medium changing devices, optical memory devices, communications devices, storage array controller devices, enclosure services devises, Simplified direct-access devices, optical card reader/writer devices, object-based storage devices, automation/drive interface devices, security manager devices, and any other suitable devices.

Before describing in detail embodiments that are in accordance with the present disclosure, it should be observed that the embodiments reside primarily in combinations of method steps, system elements, and apparatus components related to providing communication between a computing device and a SCSI peripheral via a USB connection at the computing device to a USB-SCSI interface. Accordingly, the apparatus components, system elements, and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relative relational terms such as first and second, top and bottom, and the like may be used solely to distinguish one entity or action from another entity or action without necessarily requiring or implying any actual such relationship or order between such entities or actions.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the disclosure described herein may be comprised of one or more processors and unique stored program instructions that control the one or more processors to implement, in conjunction with certain non-processor circuits, some, most, or all of the functions of communication between a computing device and a SCSI peripheral via a USB-SCSI interface as described herein. The non-processor circuits may include, but are not limited to, USB communications devices, SCSI communications devices, a radio receiver, a radio transmitter, signal drivers, clock circuits, power source circuits, and user input devices. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 illustrates an exemplary configuration 100 of a computing device 110 including a USB port 160 that may use the USB-SCSI interface 170 described herein to connect to a SCSI peripheral 190. Specifically, FIG. 1 illustrates an exemplary configuration 100 of a computing device 110 operated by a user 111 in accordance with one embodiment of the present invention. Computing device 110 may include, but is not limited to, personal computing devices, laptop computing devices, desktop computing devices, mobile computing devices, other stationary computing devices, computing peripheral devices, smart phones, wearable computing devices, medical computing devices, and vehicular computing devices. Alternatively, computing device 110 may be any computing device capable of utilizing the USB-SCSI interface 170 herein. In some variations, the characteristics of the described components may be more or less advanced, primitive, or non-functional.

In the exemplary embodiment, computing device 110 includes a processor 120 for executing instructions. In some embodiments, executable instructions are stored in a memory area 130. Processor 120 may include one or more processing units, for example, a multi-core configuration. Memory area 130 is any device allowing information such as executable instructions and/or written works to be stored and retrieved. Memory area 130 may include one or more computer readable media. As described herein, processor 120 may be configured to execute driver software and application links that are used by computing device 110 in interaction with USB-SCSI interface 170 and, as a result, in interaction with SCSI peripheral 190.

Computing device 110 also includes at least one input/output component 140 for receiving information from and providing information to user 111. In some examples, input/output component 140 is any component capable of conveying information to or receiving information from user 111. In some embodiments, input/output component 140 includes an output adapter such as a video adapter and/or an audio adapter. Input/output component 140 may alternatively include an output device such as a display device, a liquid crystal display (LCD), organic light emitting diode (OLED) display, or "electronic ink" display, or an audio output device, a speaker or headphones. Input/output component 140 may also include any devices, modules, or structures for receiving input from user 111. Input/output component 140 may therefore include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output and input device of input/output component 140. Input/output component 140 may further include multiple sub-components for carrying out input and output functions.

Computing device 110 may also include a communications interface 150, which may be communicatively coupleable to a remote device such as a remote computing device, a remote server, or any other suitable system. Communication interface 150 may include, for example, a wired or wireless network adapter or a wireless data transceiver for use with a mobile phone network, Global System for Mobile communications (GSM), 3G, 4G, or other mobile data network or Worldwide Interoperability for Microwave Access (WIMAX).

Communications interface 150 includes a universal serial bus (USB) port 160. USB port 160 is capable of connecting, via a USB cable, to any other suitable USB device including, but not limited to USB-SCSI interface 170 and other USB devices 180. USB devices 180 may include any suitable device that can connect via a USB cable to computing device 110, including, for example, USB external storage, USB peripherals, and USB appliances. As described in FIG. 2, USB-SCSI interface 170 is specifically configured to enable computing device 110 to connect to SCSI peripherals such as SCSI peripheral 190. As described herein, SCSI peripheral 190 may be any suitable SCSI peripheral. In the example embodiment, SCSI peripheral 190 is a printing device that uses computer-to-plate (CTP) imaging technology. In alternative embodiments, SCSI peripheral 190 may be a scanning device, a storage device, or any other suitable SCSI peripheral.

Figure 2:
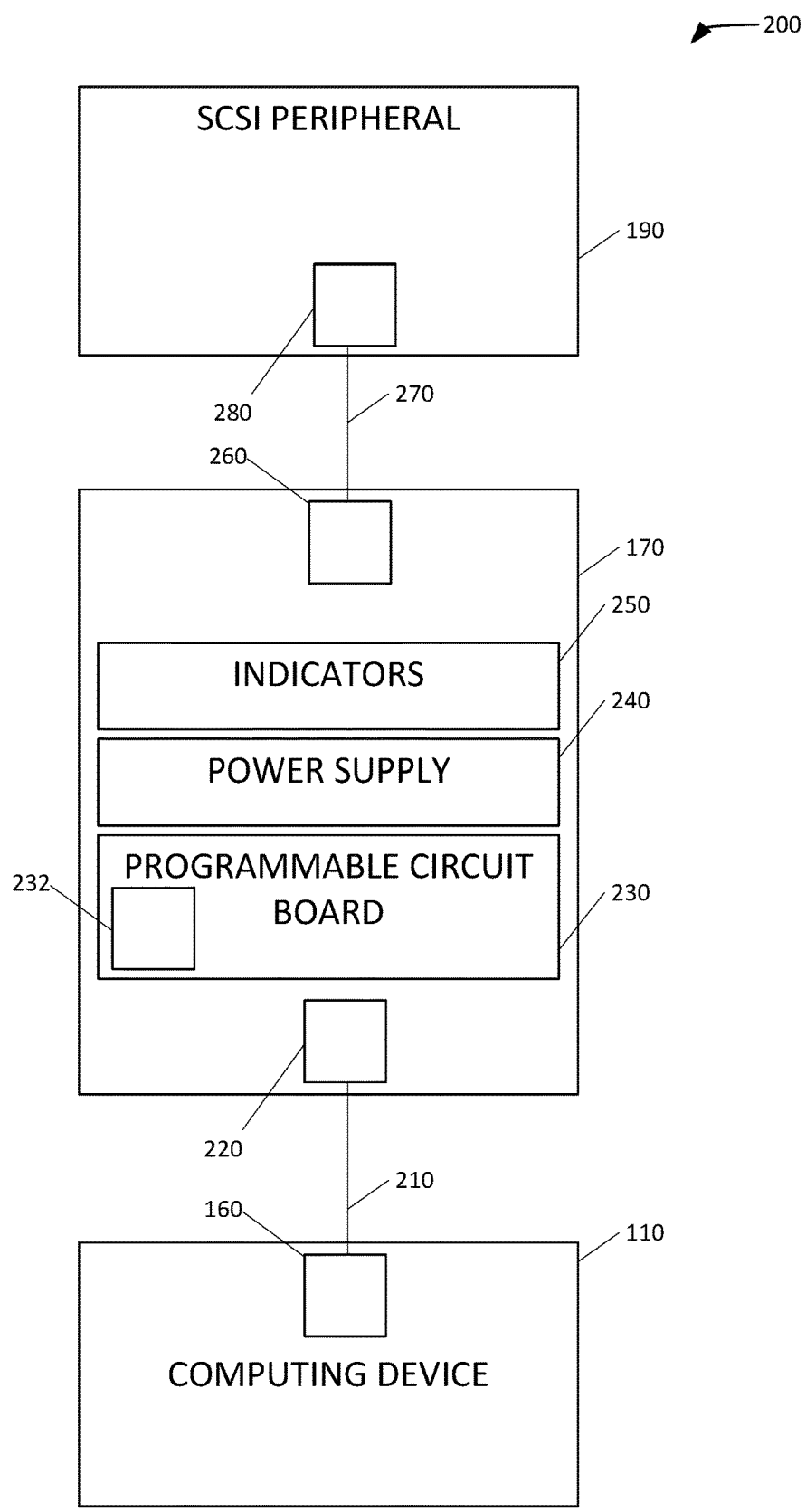
FIG. 2 illustrates an exemplary configuration of a system including a USB-SCSI interface creating connectivity between the computing device of FIG. 1 and a SCSI peripheral as described herein.

Referring to FIG. 2, an exemplary configuration of a system 200 is disclosed that includes the USB-SCSI interface 170 of FIG. 1 which is used to provide connectivity between computing device 110 of FIG. 1 and SCSI peripheral 190 of FIG. 1.

As shown in system 200, USB-SCSI interface 170 allows communication between a USB port 160 of the computing device 110 and SCSI port 280 of SCSI peripheral 190. USB-SCSI interface 170 includes an interface USB port 220 and an interface SCSI port 260. Interface USB port 220 is configured to receive a USB cable 210 which further connects to USB port 160 of computing device 110. Interface SCSI port 260 is configured to receive a SCSI cable 270 which further may connect to a SCSI port 280 of SCSI peripheral 190. As SCSI and USB ports may vary on computing devices and peripherals, SCSI and USB cables 270 and 210, respectively, accordingly may vary.

USB-SCSI interface 170 also includes a programmable circuit board (PCB) 230. PCB 230 is encoded with firmware and software 232, described herein, that is configured to provide communication between the computing device 110 and SCSI peripheral 190. Accordingly, PCB 230 is in communication with interface SCSI port 260 and also in communication with interface USB port 220. In some embodiments, PCB 230 is directly coupled to interface SCSI port 260 and interface USB port 220. In other embodiments, PCB 230 is in wired communication with interface SCSI port 260 and interface USB port 220.

As computing device 110 transmits data from its USB port 160 to interface USB port 220, PCB 230 converts that data to the proper SCSI protocol necessary to communicate with, command, or drive SCSI peripheral 190. Similarly, responsive communication from SCSI peripheral 190 is likewise transmitted back to computing device 110 upon proper conversion by PCB 230.

In at least one embodiment, USB-SCSI interface 170 is housed in a standalone enclosure and utilizes a separate switchable power supply 240. In another embodiment, USB-SCSI interface 170 may be provided within or coupled to computing device 110. In some such embodiments, USB-SCSI interface 170 may receive power via a power supply associated with computing device 110. In a further embodiment, USB-SCSI interface 170 may be provided within or coupled to SCSI peripheral 190. In some such embodiments, USB-SCSI interface 170 may receive power via a power supply associated with SCSI peripheral 190. In any embodiment, USB-SCSI interface 170 receives power from a suitable source and applies power to PCB 230 to facilitate communication between computing device 110 and SCSI peripheral 190.

In system 200, computing device 110 also includes software drivers installed thereon. In one example, when USB-SCSI interface 170 is connected at interface USB port 220 to the computing device USB port 160 via USB cable 210, the operating system of computing device 110 recognizes a new component and loads the software drivers onto itself from memory 130 (shown in FIG. 1) or any suitably accessible storage device. Once the software drivers are installed on computing device 110, computing device 110 may open up a communication channel with USB-SCSI interface 170. An identification query may be sent through USB-SCSI interface 170 to SCSI peripheral 190 via SCSI cable 270 that links interface SCSI port 260 to SCSI port 280. In response, SCSI peripheral 190 may send signals back identifying itself to computing device 110. USB-SCSI interface 170 translates such signals at PCB 230 into a format that can be communicated over USB cable 210 from interface USB port 220 to computing device USB port 160 and thus received by the operating system of computing device 110. Once communication and identification are established, software applications designed to work with SCSI peripheral 190 can be launched and SCSI peripheral 190 may perform according to the original programming and intent.

As described, USB-SCSI interface 170 utilizes a combination of firmware and software 232. Firmware and software 232 may be preprogrammed on a programmable chipset located on PCB 230, loaded onto PCB 230, and/or updated on PCB 230. Further, driver software may be pre-installed on computing device 110, loaded on demand onto computing device 110, and/or updated onto computing device 110.

In some embodiments, a plurality of indicators 250 may be included within USB-SCSI interface 170 and visible from the exterior of its housing or case. Such indicators 250 may be used to indicate that power is available to USB-SCSI interface 170 or that data is being transmitted between USB-SCSI interface 170, computing device 110, and SCSI peripheral 190. In some such embodiments, indicators 250 used may include a light emitting diode (LED), a liquid crystal display (LCD), or any other suitable indicator.

As described herein, the SCSI and USB cables 270 and 210, respectively, utilized may include any suitable SCSI and USB cables 270 and 210, respectively, for communication with computing devices and peripherals.

In operation, USB-SCSI interface 170 may be configured by coupling USB cable 210 between USB port 160 on computing device 110 and interface USB port 220, and further coupling SCSI cable 270 between interface SCSI port 260 and SCSI port 280 on SCSI peripheral 190, and providing power to USB-SCSI interface 170 via a power supply 240. Further, computing device 110 is configured by installing driver software and application links onto computing device 110 and launching software application links associated with SCSI peripheral 190.

The apparatus, systems, and methods described herein utilize USB port 160 of computing device 110 as it is a frequently available form of hardware connectivity in modern computing devices. By engineering an apparatus that can plug into a USB slot 160 of computing device 110 and convert such signals and protocols to communications suitable for SCSI, SCSI peripheral 190 may remain in use, saving in replacement and upgrade costs.

Figure 3:
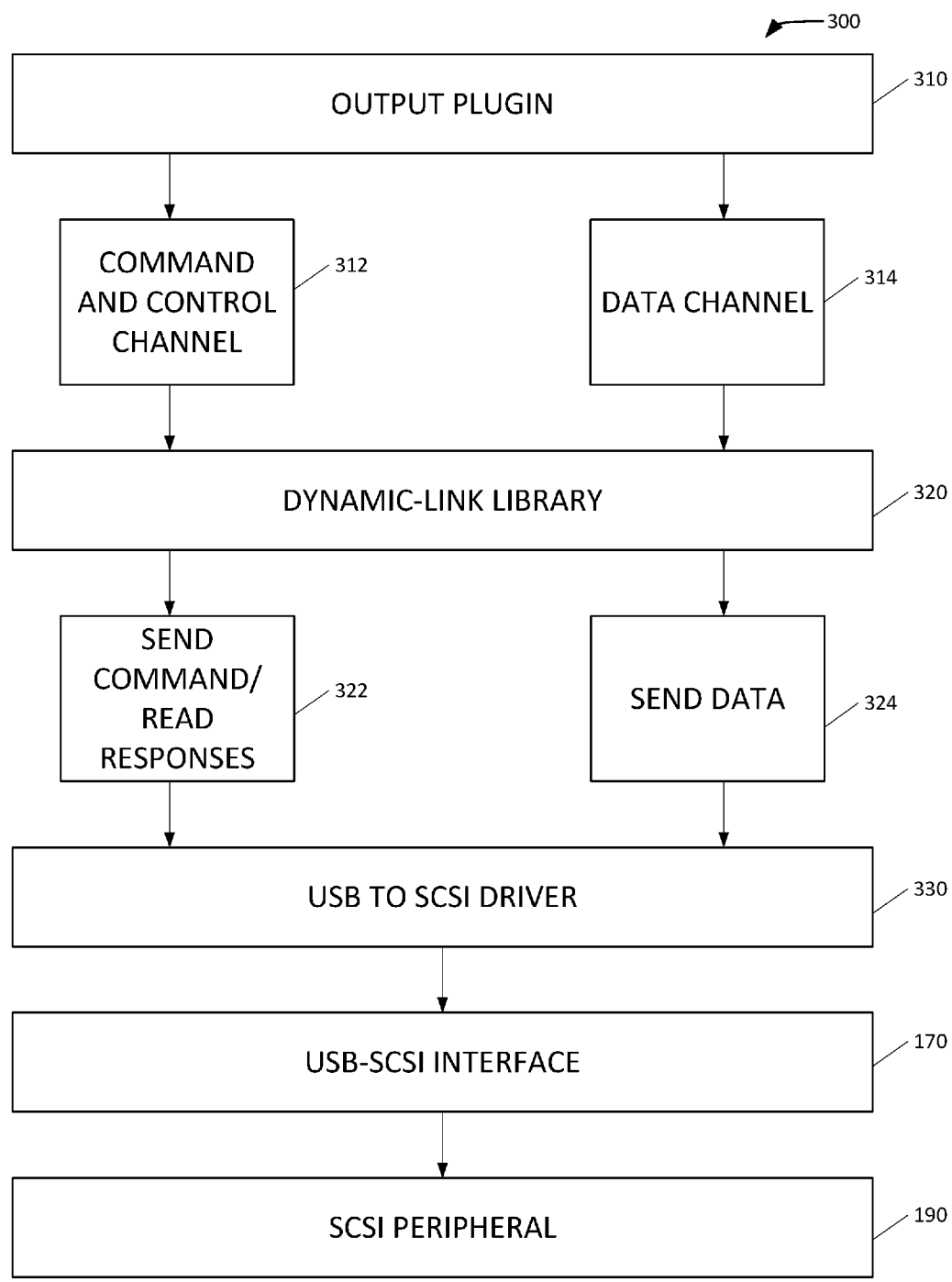
FIG. 3 illustrates a data flow chart showing the communication path of information from a computing device to a SCSI peripheral via a USB-SCSI interface.

Referring to FIG. 3, a data flow chart 300 is shown that illustrates the communication path of information from a computing device 110 (shown in FIGS. 1 and 2) to SCSI peripheral 190 (shown in FIGS. 1 and 2) via USB-SCSI interface 170. FIG. 3 illustrates an abstracted view of how commands are submitted from an application on computing device 110 into an output format available via USB and processed until it may be received by SCSI peripheral 190. As shown in FIG. 3, such communications may leverage output plugins 310, dynamic-link library 320, USB-to-SCSI drivers 330, and USB-SCSI interface 170.

Output plugin 310, dynamic-link library 320, and USB-to-SCSI drivers 330 provide a communications channel between higher level software on computing device 110 and hardware allowing for processing by SCSI peripheral 190. In the example embodiment, the higher level software may be application software that provides output that is used to command SCSI peripheral. In at least one embodiment wherein SCSI peripheral is a CTP printer, the application software may be a printing software including an image processor such as a raster image processor (RIP) that is configured to produce a raster image to command a printer.

In one embodiment, an output plugin 310 is integrated with or receives information from a software application such as an image processor and creates an output file used to provide commands to the SCSI peripheral 190.

The dynamic-link library 320 receives data from output plugin 310 along two channels, a command and control channel 312, and a data channel 314, and formats them for subsequent processing along send command/read responses channel 322 and send data channel 324, respectively. Command channel 312 processes to send command/read responses channel 322 that allows transmission of data commands along two defined data paths. A first command path allows downstream commands from dynamic-link library 320 to firmware 232 and ultimately to SCSI peripheral 190. A second command path receives responses from USB-SCSI interface 170 and transmits such data back to dynamic-link library 320 and to computing device 110. Send data channel 324 allows for transmission of data associated with commands for SCSI peripheral 190 from dynamic-link library 320. In some examples, an additional command path is used on channel 322 for reading and writing debug messages available on firmware 232.

Commands and data transmitted along channels 322 and 324 are subsequently processed and provided to USB-to-SCSI driver 330 which makes such commands and data available to USB-SCSI interface 170 via a USB cable such as cable 210 (shown in FIG. 2).

Firmware 232 processes commands and data received along channels 322 and 324 and converts such commands and data into SCSI-compliant commands and data which are transmitted to SCSI peripheral 190.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

What is claimed:

1. An apparatus for controlling a parallel small computer system interface (SCSI) peripheral via a universal serial bus (USB) port of a computing device, said apparatus comprising:
    a programmable circuit board (PCB) having firmware encoded thereon, wherein said firmware is configured to convert USB signals to SCSI signals and to further convert SCSI signals to USB signals;
    a power supply configured to provide power to said PCB;
    a SCSI interface coupled to said PCB and configured to receive a parallel SCSI cable to provide connectivity to said parallel SCSI peripheral, wherein said parallel SCSI peripheral is a computer-to-plate (CTP) device; and
    a USB interface coupled to said PCB and configured to receive a USB cable to provide connectivity to said computing device via said USB port of said computing device.

2. The apparatus according to claim 1, further comprising:
    an indicator configured to indicate that data is being transmitted between said PCB, said computing device, and said parallel SCSI peripheral.

3. The apparatus according to claim 1, wherein said firmware is configured to process application output from said computing device along a command channel and a data channel.

4. The apparatus according to claim 1, wherein said firmware is configured to read and write debug messages for said computing device.

5. The apparatus according to claim 1, wherein said apparatus is configured to transmit an identification query from said computing device to said parallel SCSI peripheral via said USB cable and said parallel SCSI cable, and further configured to transmit a responsive signal from said parallel SCSI peripheral to said computing device via said parallel SCSI cable, and said USB cable; and additionally configured to establish communication between said computing device and said parallel SCSI peripheral.

6. A system configured to provide access for a computing device without small computer system interface (SCSI) connectivity to a parallel SCSI peripheral, the system comprising:
    a computing device comprising a processor and a memory, said computing device having a first universal serial bus (USB) port;
    a parallel SCSI peripheral having a first SCSI port, wherein said parallel SCSI peripheral is a computer-to-plate (CTP) device; and
    a USB-SCSI interface comprising:
        a programmable circuit board (PCB) having firmware encoded thereon, wherein said firmware is configured to convert USB signals to SCSI signals and to further convert SCSI signals to USB signals;
        a power supply configured to provide power to said PCB;
        a SCSI interface coupled to said PCB and configured to receive a parallel SCSI cable to provide connectivity to said parallel SCSI peripheral at said first SCSI port; and
        a USB interface coupled to said PCB and configured to receive a USB cable to provide connectivity to said computing device via said first USB port of said computing device,
    wherein said USB-SCSI interface is in communication with said computing device via said USB cable and further in communication with said parallel SCSI peripheral via said parallel SCSI cable.

7. The system of claim 6, wherein said USB-SCSI interface further comprises:
    an external housing configured to enclose said PCB, said power supply, said SCSI interface, and said USB interface.

8. The system of claim 6, wherein said USB-SCSI interface further comprises:
    an indicator configured to indicate that data is being transmitted between the USB-SCSI interface, the computing device, and the parallel SCSI peripheral.

9. The system of claim 6, wherein said processor is configured to execute driver software used to interact with said USB-SCSI interface.

10. The system of claim 9, wherein said computing device is configured to load said driver software from memory upon discovery of said USB-SCSI interface by an operating system associated with said computing device.

11. The system of claim 6, wherein said processor is configured to:
    transmit an identification query to said parallel SCSI peripheral;
    receive a responsive signal from said parallel SCSI peripheral; and
    establish communication between said computing device and said parallel SCSI peripheral based upon the identification query and the responsive signal.

12. A method for providing access from a computing device without small computer system interface (SCSI) connectivity to a parallel SCSI peripheral, the method comprising:
    providing a programmable circuit board (PCB);
    encoding programming code onto the PCB, wherein the programming code includes firmware configured to convert USB signals to SCSI signals and to further convert SCSI signals to USB signals;
    providing a USB interface port in communication with the PCB;
    providing a SCSI interface port in communication with the PCB; and
    providing a power supply coupled to the PCB,
    wherein the PCB is configured to be communicatively coupled to a USB port of a computing device via the USB interface port, and wherein the PCB is configured to be communicatively coupled to a SCSI port of a parallel SCSI peripheral via the SCSI interface port, wherein said parallel SCSI peripheral is a computer-to-plate (CTP) device.

13. The method of claim 12, further comprising coupling the PCB to the computing device using a USB cable.

14. The method of claim 12, further comprising coupling the PCB to the parallel SCSI peripheral using a parallel SCSI cable.

15. The method of claim 12, further comprising:
transmitting an identification query from the computing device through the PCB to the parallel SCSI peripheral;
transmitting a responsive signal from the parallel SCSI peripheral to the computing device via the PCB; and
establishing communication between the computing device and the parallel SCSI peripheral.

16. The method of claim 12, further comprising providing an indicator configured to indicate that data is being transmitted between the USB-SCSI interface, the computing device, and the parallel SCSI peripheral.

17. The apparatus according to claim 1, wherein:
said SCSI interface is configured to receive a parallel SCSI cable to provide parallel SCSI connectivity to said parallel SCSI peripheral, wherein said parallel SCSI peripheral provides non-storage capabilities.

18. The apparatus according to claim 1, wherein:
said SCSI interface is configured to receive a parallel SCSI cable to provide parallel SCSI connectivity to said parallel SCSI peripheral, wherein said SCSI interface provides a communications channel allowing for said computing device to use a software application to command said SCSI peripheral.

19. The apparatus according to claim 18, wherein said software application is an image processing application.

* * * * *